US009104814B1

(12) United States Patent
Mompoint et al.

(10) Patent No.: US 9,104,814 B1
(45) Date of Patent: Aug. 11, 2015

(54) SYSTEM AND METHOD FOR INTEGRATED TESTING OF A VIRTUAL SPACE

(71) Applicants:Anthony Mompoint, San Francisco, CA (US); Christopher Jonathan Casey, Seattle, WA (US); Michael Williams, San Francisco, CA (US)

(72) Inventors: Anthony Mompoint, San Francisco, CA (US); Christopher Jonathan Casey, Seattle, WA (US); Michael Williams, San Francisco, CA (US)

(73) Assignee: KABAM, INC., San Francisco, CA (US)

( * ) Notice: Subject to any disclaimer, the term of this patent is extended or adjusted under 35 U.S.C. 154(b) by 74 days.

(21) Appl. No.: 13/887,170

(22) Filed: May 3, 2013

(51) Int. Cl.
*G06F 9/44* (2006.01)
*G06F 11/36* (2006.01)

(52) U.S. Cl.
CPC ........ *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 5,386,565 A * | 1/1995 | Tanaka et al. | ................. | 717/128 |
| 6,002,871 A * | 12/1999 | Duggan et al. | ................. | 717/135 |
| 6,031,990 A * | 2/2000 | Sivakumar et al. | ........... | 717/124 |
| 6,117,181 A * | 9/2000 | Dearth et al. | .................... | 703/22 |
| 6,158,031 A * | 12/2000 | Mack et al. | ................... | 714/724 |
| 6,219,829 B1 * | 4/2001 | Sivakumar et al. | ........... | 717/131 |
| 6,308,146 B1 * | 10/2001 | La Cascia et al. | .............. | 703/22 |
| 6,871,341 B1 * | 3/2005 | Shyr | ............................ | 717/131 |
| 7,055,137 B2 * | 5/2006 | Mathews | ...................... | 717/125 |
| 7,076,713 B1 * | 7/2006 | Hess | ............................ | 714/741 |
| 7,174,541 B2 * | 2/2007 | Muller et al. | .................. | 717/124 |
| 7,337,432 B2 * | 2/2008 | Dathathraya et al. | ......... | 717/125 |
| 7,552,424 B1 * | 6/2009 | Bischof et al. | ................ | 717/127 |
| 7,996,818 B1 * | 8/2011 | Venugopal | ..................... | 717/124 |
| 8,332,818 B1 | 12/2012 | Haugh et al. | .................. | 717/124 |
| 8,549,479 B2 * | 10/2013 | Chavvakula et al. | ......... | 717/124 |
| 2003/0115527 A1 * | 6/2003 | Watanabe | ...................... | 714/741 |
| 2004/0243381 A1 * | 12/2004 | Kuturianu et al. | .............. | 703/22 |
| 2007/0220492 A1 * | 9/2007 | Brugiolo et al. | .............. | 717/126 |
| 2007/0234293 A1 * | 10/2007 | Noller et al. | .................. | 717/124 |
| 2008/0222608 A1 * | 9/2008 | Gartner et al. | ................ | 717/124 |
| 2008/0244062 A1 * | 10/2008 | Elangovan et al. | ........... | 709/224 |
| 2008/0282230 A1 * | 11/2008 | Belvin et al. | ................... | 717/125 |
| 2009/0198484 A1 * | 8/2009 | Christensen et al. | ........... | 703/22 |
| 2010/0146420 A1 | 6/2010 | Bharadwaj et al. | ........... | 715/764 |
| 2010/0153087 A1 * | 6/2010 | Kirtkow et al. | .................. | 703/21 |
| 2011/0022899 A1 * | 1/2011 | Greenberg et al. | .............. | 714/47 |
| 2011/0276945 A1 * | 11/2011 | Chasman et al. | ............. | 717/124 |
| 2012/0124559 A1 * | 5/2012 | Kondur | ......................... | 717/125 |

(Continued)

OTHER PUBLICATIONS

Mercury QuickTest Professional User's Guide, Version 8.0.1, published by Mercury, 2004, pp. 1-10, 33-81,88-92,103,119-122,137-142,288-298,409-435,482-484,524-525,542,742-744.*

(Continued)

*Primary Examiner* — Tuan Q. Dam
*Assistant Examiner* — Zheng Wei

(57) ABSTRACT

A system and method for performing integrated testing of a virtual space are disclosed. For performing the integrated testing, test inputs simulating virtual space actions by users may be obtained for one or more test cases. Responsive to such test inputs being obtained, one or more test commands may be generated for testing virtual space functionalities implemented on client computing platforms and for testing server components being executed on one or more virtual space servers to facilitate user participation of the virtual space. The generated test commands may be executed and test results may be obtained. The obtained test results may be compared with expected results corresponding to the test cases for verification.

18 Claims, 4 Drawing Sheets

(56) References Cited

U.S. PATENT DOCUMENTS

| | | | |
|---|---|---|---|
| 2012/0174075 A1* | 7/2012 | Carteri et al. | 717/127 |
| 2012/0204155 A1* | 8/2012 | Ben-Artzi et al. | 717/125 |
| 2013/0085741 A1* | 4/2013 | Segall et al. | 703/21 |
| 2013/0091494 A1* | 4/2013 | Sowerby et al. | 717/129 |
| 2013/0152047 A1* | 6/2013 | Moorthi et al. | 717/124 |
| 2014/0298298 A1* | 10/2014 | Cook et al. | 717/125 |

OTHER PUBLICATIONS

Mercury Using QuickTest Professional 8.0 published by Mercury Education Service, 2004, pp. 1-214.*

"Web Testing With TestComplete", http://smartbear.com/products/qa-tools/automated-testing-tools/web-ria-testing/web-testing . . . , printed Apr. 19, 2013, 2 pages.

"Integration Testing With Selenium", Alex Collins on Apr. 17, 2012, Filed in: Enterprise Java Tags: Selenium Testing, Java Code Geeks, Apr. 19, 2013, 7 pages.

Integration tests with Maven, JUnit and Spring Posted by Eugene as Unit Testing (Dec. 28), ScriptKiddie Blog, http:/www.scriptkiddieblog.com/unit-testing/integration-tests-with-maven-junit-and-spring/. . . , printed Apr. 19, 2013, 5 pages.

Selenium-IDE, Selenium Documentation, http://docs.seleniumhq.org/docs/02_selenium_ide.jsp, printed Apr. 19, 2013, 22 pages.

* cited by examiner

SYSTEM AND METHOD FOR INTEGRATED TESTING OF A VIRTUAL SPACE

FIELD OF THE DISCLOSURE

This disclosure relates to testing a virtual space, the virtual space being tested on client side and server side by simulating user actions in the virtual space.

BACKGROUND

Systems that provide functionality testing for software being executed on client computers are known. In those systems, user inputs may be simulated to test software features and test results may be compared with expected outcomes predefined by testers or software developers. Typically, such testing is performed by executing test cases through test engines provided by those systems. In some of those systems, graphic user interface(GUI) of the software may be tested by simulating user inputs to the GUI, capturing screen images of the GUI, recognizing GUI behaviors in response to the simulated user inputs, and comparing the recognized GUI behaviors with predefined GUI behaviors corresponding to the simulated user inputs.

Systems that provide server side testing are also known. Typically, such server side testing is performed by executing test scripts to invoke services provided by the server, obtaining testing results from the server, and comparing the obtained test results with expected outcome predefined by the provider of the servers.

SUMMARY

One aspect of the disclosure relates to testing a virtual space through user virtual space actions simulated by test inputs. Such test inputs may be obtained from test cases. One or more test commands may be generated for the test inputs. The generated test commands may include a set of test commands for testing functionalities implemented on client computing platforms responsive to the user actions simulated by the test inputs. Such client side functionality testing may include testing virtual space view presentation, graphics rendering, action request generation, client-side virtual space execution, client computing platform configuration, caching, communication, security, and/or any other functionalities that may be implemented on client computing platforms to facilitate user interaction with the virtual space. The generated test commands may include a set of test commands for testing virtual space server components that facilitate the virtual space. The server components that may be tested may include one or more server modules being executed by virtual space servers, services provided by virtual space servers, databases employed by the virtual space servers, and/or any other server components that facilitate the virtual space. This may enable integrated virtual space on the client side and server side concurrently as driven by the user action simulated by the test inputs. This may improve the virtual space by ensuring functionalities implemented on client computing platforms and virtual space features provided by the virtual space servers are consistent as the virtual space progresses.

In some implementations, a test system configured to provide integrated testing of a virtual space may include a server. The server may be configured to execute one or more of a test-case module, a test-command module, a test-execution module, a test-result module, a verification module, and/or other modules.

The test-case module may be configured to receive test cases and obtain test inputs for the received test cases. Test cases for testing a virtual space may be created by a developer of the test system, a tester of the virtual space, quality assurance personnel of the virtual space, a provider of the virtual space, and/or any other entities that may create test cases for testing the virtual space. In some implementations the test cases may be received by the test-case module 106 at a predetermined frequency, e.g., on a nightly basis, via a scheduler module of the test system 100. For a test case received by the test-case module, test inputs simulating user actions in the virtual space may be obtained. The simulated user actions may include user actions for interacting with the virtual space (e.g., initiating virtual space maneuvers, interactions with virtual space characters and/or objects, purchasing virtual items, participating in virtual space activities, and/or any other user interaction with the virtual space), for customizing the virtual space (e.g., customizing the view and/or sound presented on the client computing platform, customizing virtual space GUI, customizing communication methods for the user in the virtual space, and/or any other virtual space customization for the user), and/or any other user actions.

The test-case module may be configured to obtain test inputs for test cases by parsing the content of the test cases. For obtaining the test inputs, the test-case module may employ token lists and/or token rules specified by the developer of the test system, tester of the virtual space, quality assurance personnel of the virtual space, provider of the virtual space, and/or any other entities. With the specified tokens and token rules, the test-case module may parse the test case and extracting tokens specified in the test case and the test inputs may be obtained by assembling the extracted tokens. In some implementations, the test-case module may be configured to verify whether the obtained test inputs conform to one or more test rules and generate error message indicating detected invalid test inputs at runtime of the test system.

Test-command module may be configured to generate test commands based on the test inputs obtained by the test-case module. In response to an obtained test input for a test case received by the test-case module, the test-command module may generate one or more test commands for testing functionalities implemented on client computing platform that facilitates the user actions simulated by the obtained test input, and test commands for testing server components that facilitate the execution of the user actions simulated by the obtained test input on one or more virtual space servers. The client-side functionalities that may be tested may include virtual space view presentation, graphics rendering, action request generation, client-side virtual space execution, client computing platform configuration, caching, communication, security, and/or any other functionalities that may be implemented on client computing platforms to facilitate user interaction with the virtual space. The server components that may be tested may include server modules that implement virtual space logic, physics, artificial intelligence, character interaction, communication within virtual space, view information determination, scripting, and/or any other functionalities for facilitating user interaction with the virtual space; may include services provided by the virtual space to facilitate user participation in the virtual space such as, without limitation, account authentication, load balancing, zone assignment, virtual space information replication, billing, and/or any other services provided by virtual servers to facilitate user participation in the virtual space; and may include databases employed by the virtual space servers, such as but not limited to, user, character, topology, item, model, action and/or any other databases employed by the virtual space servers to facilitate user participation in the virtual space.

In some implementations, for generating test commands for testing client-side functionalities and/or for testing server components, semantics such as, without limitation, application programming interface (API), client computing platform information, command line syntax, service syntax, and/or any other semantics may be obtained and employed by the test-command module to generate test commands. In some implementations, the test-command module may be configured to dynamically determine a set of client-side functionalities and/ or server components that may be tested in response to a specific user action simulated by an obtained test input.

Test-execution module may be configured to execute the test commands generated by the test-command module. For executing the test commands, the test-execution module may generate, for example, but not limited to, intra procedure calls (IPC), remote procedure calls (RPC), operating system commands, virtual space commands, and/or any system calls to client computing platforms and/or virtual space servers for executing the test commands generated by the test-command module. In some implementations, the test-execution module may be configured to obtain information indicating locations of server modules, services, database access, and/or any other server information for executing test commands that test server components. In some implementations, the test-execution module may be configured to verify test commands generated by the test command module based on the availability, performance, load, and/or any other properties of the client computing platforms and/or the virtual space servers. In some implementations, the test-execution module may be configured to generate OS commands to launch virtual space GUI on a client computing platform for testing virtual space GUI behaviors in response to a test command.

The test-result module may be configured to obtain test results of test commands executed by the test-execution module. In some examples, the test-result module may be configured to obtain the test results from data buffers via electronic storage of the test system. In some examples, for obtaining the test results, the test-result module may generate commands, or system calls to retrieve the test results from the client computing platforms and/or virtual space servers. For instance, to retrieve test results for testing virtual space GUI behaviors, the test result module may be configured to generate system calls to invoke an image recognition module configured to capture screen images presented on a display coupled to or included in the client computing platform that executed the test command for testing virtual space GUI behavior. The test-result module may be configured to employ the image recognition module (e.g., through the API provided by the image recognition module) to obtain GUI behaviors resulted from the test command by analyzing the screen image(s) captured by the image recognition module. In some examples, the test-execution module may generate one or more data quarries for retrieving test results from the databases. For such data query, the test-execution module may obtain information regarding data access points for retrieving results from the database.

Verification module may be configured to obtain expected test results and to verify whether the test results obtained by the test-result module match the expected test results. For a given test case, expected test result(s), or golden results, may be specified by the developer of the test system, tester of the virtual space, quality assurance personnel of the virtual space, provider of the virtual space, and/or any other entities related to the test system. Based on the obtained expected test results for the test case, the verification module may verify the test results obtained by the test-result module by comparing the test results with the obtained expected test results. In cases where the test results for the corresponding test case do not match the expected test results, the verification module 114 may be configured to generate error messages.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
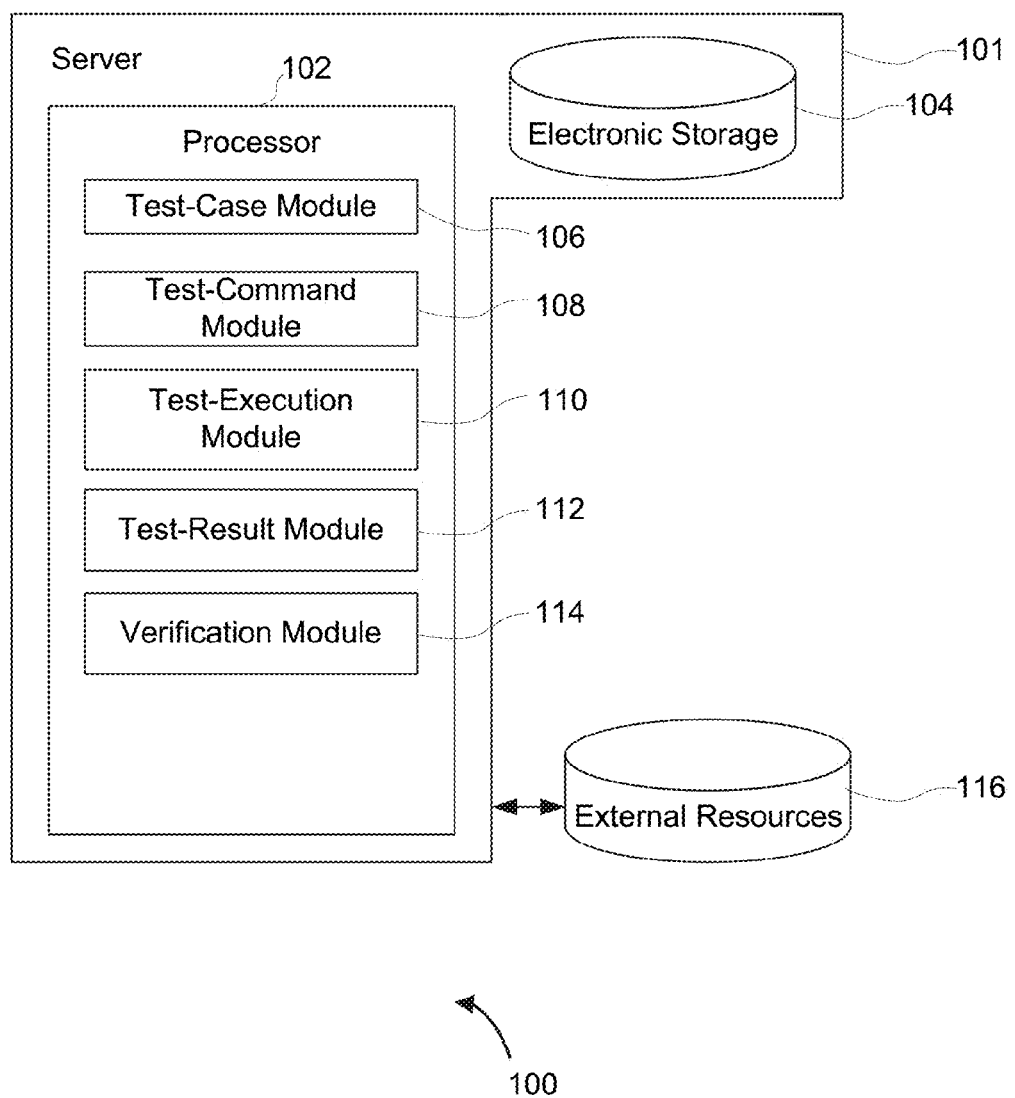
FIG. 1 illustrates one example of a system configured to provide integrated testing of a virtual space.

FIG. 1 illustrates one example of a system configured to provide integrated testing of a virtual space. The integrated testing may be driven by test cases with test inputs simulating user actions. Test commands for testing virtual space functionalities implemented on client computing platforms and for testing server components facilitating the virtual space may be generated based on the test inputs. The test commands may be executed on the client computing platforms and/or virtual space servers. Test results may be obtained and compared with expected results for verification in response to the execution of the generated test commands. Such integrated testing of virtual space may ensure client-side virtual space functionalities and as well as server-side components work correctly to facilitate user virtual space actions.

In some implementations, test system 100 may include server 101. The server 101 may include a processor 102 configured to execute one or more computer program modules. The one or more computer program modules may include one or more of a test-case module 106, a test-command module 108, a test-execution module 110, a test-result module 112, a verification module 114, and/or other modules.

The test-case module 106 may be configured to receive test cases and obtain test inputs for the received test cases. Such test cases may be created by testers, quality assurance personnel, developer, provider, and/or any other entities that may create test cases for testing virtual space. In some implementations the test cases may be created and stored on the electronic storage 104 of the testing system 100. In those implementations, the test cases may be received by the test-case module 106 at a predetermined frequency, e.g., on a nightly basis, via a scheduler module of the test system 100.

One or more test inputs may be specified for a given test case received by the test-case module 106. The specified test inputs may simulate user actions for participation in the virtual space. The simulated user actions may initiate user interaction with the virtual space. Users of the virtual space are typically enabled to take actions in the virtual space by providing inputs through, such as, but not limited to, play buttons, joysticks, motion sensors, cameras, keyboards, mouse, and/or any other control device provided by or coupled to client computing platforms associated with the users. In some implementations, the actions may be enabled by controls provided by graphical user interface (GUI) implemented on client computing platforms, such as but not limited to, graphics, menus, dialog boxes, forms, sliding bars, buttons, radio box, tabs, and/or any other controls provided by the GUI. In any case, the user actions may direct user characters to perform virtual space maneuvers, to participate in virtual activities, to interact with other characters and/or engage in any other interactions within the virtual space. For example, a user may provide an input specifying an amount of troops to be marched to a virtual space location to defend that virtual space location; to build a barrack at a virtual space location (e.g., a user city); to attack a monster guarding a virtual space object (e.g., a gold mine); to interact with another character (e.g., chatting); and so on. Virtual space commands may be generated for the user action and may be executed in the virtual space such that the user interactions with the virtual space may be effectuated in the virtual space following the execution of the virtual space commands. Execution of such a virtual space command may produce changes to the virtual space state, which may reflect progresses and/or results of the user initiated actions. In some examples, state changes caused by user actions may be recorded in the electronic storage to facilitate persistency throughout the instance of the virtual space. In any case, such user actions may be simulated in a given test case by specifying one or more test inputs.

In some examples, the simulated user actions by the test inputs may initiate virtual space customization for the users. The simulated user customization may include adjusting virtual space GUI interface display (e.g., size, number of controls appear in the GUI, information appears in the GUI, and so on), sound volume, communication methods in the virtual space (e.g., docket a chat interface to the virtual space GUI interface, switching to a full chat mode), user character customization, and/or any other customization that may be made through user actions.

In some implementations, the test inputs simulating user actions may be specified through simple textual strings such as, without limitation, "build a barrack in user A's city", "purchase a virtual item in a virtual store", "send a chat message to user B on behalf user A" and so on. In some implementations, specific syntax may be specified for the test inputs by the testers, quality assurance personnel, virtual space developers, and/or any other entities that may specify syntax for the test inputs. For example, acceptable test input tokens may be predefined by the developer of the test system 100. Such test input tokens may include a list of virtual space actions testable by the test-case module, a list of virtual space objects that may be acted on by the testable virtual space actions, a list of virtual space locations where the testable virtual space actions may be carried out in the virtual space, a list of items that may be purchased in the virtual space, and/or any other test inputs tokens. In that example, simple token rules may be specified by the developer of the test system 100 to specify specific semantics the test inputs should conform to. For example token rules may be specified such that a test input should start with a testable user action, followed by a virtual space object that may be acted by the test user action, and a location where the testable user may be carried out in the virtual space.

In some implementations, the test-case module 106 may be configured to obtain the test inputs in a received test case by parsing the content of the test case. For obtaining the test inputs, the test-case module 106 may employ the token lists and/or token rules to parse the test case and to extract tokens specified from the test case. The extract tokens may be used by the test-case module 106 to assemble corresponding test inputs. In some implementations, the test-case module 106 may be configured to obtain test rules specified the developer of the test system 100, the creator of the test case, quality assurance personnel, and/or any other entities that may specify test rules and verify whether the obtained test inputs conform to the obtained test rules. In some examples, the test rules may specify a set of conditions and/or restriction the test inputs should abide by. For example, the test rules may specify that the test inputs may not simulate a crawling action by a user followed by a conflicting action by the user (e.g. jumping) because such an action sequence is not enabled in the virtual space. In those implementations, the test-case module 106 may be configured to verify whether the obtained test inputs conforms to the obtained test rules and generate error message indicating detected invalid test inputs at runtime of the test system 100.

Test-command module 108 may be configured to generate test commands based on the test inputs obtained by the test-case module 106. The generated test commands may be executed, for example by the test-execution module 110, to test virtual space presentation, logic, services, and/or any other virtual space features driven by the simulated user actions. In response to an obtained test input for a received test case by the test-case module 106, the test-command module 108 may generate one or more test commands for testing functionalities implemented on client computing platform that facilitates the user actions simulated by the obtained test input, and/or test commands for testing server components that facilitate the virtual space on one or more virtual space servers.

For a test input simulating user actions as obtained by the test-case module 106, the test-command module 108 may be configured to generate test commands for testing virtual space functionalities implemented on a given client computing platform in response to the test input. Such client-side functionalities my include virtual space view presentation, graphics rendering, action request generation, client-side virtual space execution, client computing platform configuration, caching, communication, security, and/or any other functionalities that may be implemented on client computing platforms to facilitate user interaction with the virtual space. For example, an obtained test input may simulate a user action of building a barrack at a user city. For such a test input, the test-command module 108 may generate a set of test commands that tests, without limitation, virtual space view presentation on the client computing platform (e.g. a set of test commands that invokes virtual space GUI, selects a city menu for the user from the virtual space GUI, chooses a build-action menu from the city menu, and selects an option to initiate the barrack building for the user). The test-command module 108 may generate test commands to test other client-side functionalities such as graphics rendering (e.g., generates a test command that invokes rendering modules implemented on client computing platform to render an graphical art of the barrack), client-side virtual space execution (e.g., generate a test command that invokes client side virtual space simulation of building a barrack in the virtual space based on the state information cached on the client computing platform), action request generation (e.g., generates a test command that invokes action module implemented on the client computing platform to generate a request to a virtual space sever to execute barrack building action in the virtual space), client side configuration (e.g., one or more test commands that adjust the size of the virtual space GUI presented on the client platform, set an amount of information to be included in the virtual space GUI, adjust sound volume, and/or any other client-side configuration), security (e.g., generate a test command that verifies account authentication on the client side), caching (e.g., generate a test command to invoke cache module on the client computing platform to cache new state information indicating the barrack building on the client computing platform), network communication (e.g., a test command that generates a loopback network message for testing the communication layer implemented on the client computing platform), and/or any other client-side functionalities.

In some implementations, for generating test commands that invoke proper functionalities implemented on the client computing platform in response to an obtained test input, semantics such as, without limitation, application programming interface (API), client computing platform information (e.g. Internet Protocol-IP address, OS type and version, available ports, and so on), command line syntax, and/or any other semantics may be obtained by the test-command module 108. In some examples, API provided by virtual space modules implemented on the client computing platforms may be specified by the developer of the virtual space and such API information may be configured into the test-command module 108 such that the generated test commands may include the API information for testing the client-side virtual space modules.

In some implementations, the test-command module 108 may dynamically determine a set of client-side functionalities that may be tested in response to a specific user action simulated by a given test input. For example, such determinations may be made by the test-command module 108 based on associations between test inputs and corresponding test commands predefined by the developer of the test system 100. For instance, an association between a test input that simulates build action by users and a set of test commands that test virtual space GUI, caching, and action request generation may be specified; another association between a test input that simulates user adjustment of virtual space GUI size and test commands for testing client side configuration and graphics optimization maybe specified; yet another association between test input that simulates user action directing a user character maneuver in the virtual space and a set of test commands that test client-side virtual space execution may be specified; and so on.

Responsive to test inputs obtained by test-case module 106, the test-command module 108 may generate a set of test commands for testing server components that facilitate the user actions simulated by the test inputs. Examples of such server components may include server modules that implements virtual space logic, physics, artificial intelligence, character interaction, communication within virtual space, view information determination, scripting, and/or any other functionalities for user interaction with the virtual space. The server components may include services provided by the virtual space to facilitate user participation of the virtual space such as, without limitation, account authentication, load balancing, zone assignment, virtual space information replication, billing, and/or any other services provided by virtual servers to facilitate user participation in the virtual space. The server components may include databases, such as but not limited to, user, character, topology, item, model, action and/or any other databases employed by the virtual space servers to facilitate user participation in the virtual space.

For the obtained test put simulating a user action, one or more test commands may be generated by the test-command module 108 for testing server modules executing an instance of the virtual space. These server modules may be executed on one or more virtual space servers to facilitate functionalities, such as, but not limited to, user mechanics (e.g., state machine and animation, camera controls, collision calculation, movement calculation, and so on), virtual space physics (e.g., force and constraints calculation, ray or shape casting, rigid body calculation, shape calculation, physics simulation, and so on), high-level virtual space flow, artificial intelligence (e.g., goals and the decision-making, action calculation, site and trace perception, path finding, and so on), virtual space wide graphics rendering (e.g., terrain rendering or simulation and rendering, and so on), topology evolvement, character evolvement (e.g., personality development, presentation development, narrative development, and so on), resource consumption, activity management, matchmaking, communication within the virtual space (e.g., chat service implementation, server-generated messaging, and so on), virtual space loading and streaming, virtual space view determination, and/or any other functionalities that may be provided by the server modules. For example, responsive to an obtained test put simulating user action of attacking a monster at a virtual space location, the test-command module 108 may generate a test command for testing user mechanics such that a server module is invoked to determine user movements based on the test input, a test command for testing a server module that implements collision and physics within the virtual space such that the test command invokes the server module to simulate collusion and physics in response to the user movement, a test command for testing a server module that generates event notifications within the virtual space such that the server module is invoked to generate an event notification notifying the user attacking of the monster.

For the obtained test put simulating a user action, one or more test commands may be generated by the test-command module 108 for testing services provided by virtual space servers to facilitate user participation of the virtual space. Such services may be provided by the virtual space servers to facilitate, e.g., without limitation, account authentication, load balancing (e.g., hot swapping in case of a server failure, load distribution based on server performance, and so on), zone assignment (e.g., assigning a user to a proper server located within the region of the user), virtual space information replication (e.g., data replication between servers), billing (pricing of virtual items, billing determination based on number of hours the user has engaged in the virtual space, and so on), and/or any other services that may be provided by virtual space servers to facilitate user participation in the virtual space. For example, in a case where a test input simulating the user attacking a monster is obtained by the test-case module 106, the test command module 108 may generate a test command for testing zone assignment services provide by the server such that a zone assignment for the user is invoked, a test command for testing virtual space information replication such that the replication of virtual space information indicating user attacking of the monster is invoked, a test command for testing load balancing performed by the server such that a load balancing operation is invoked, and so on.

For the obtained test put simulating a user action, one or more test commands may be generated by the test-command module 108 for testing databases employed by virtual space servers to facilitate user participation of the virtual space. Such virtual space databases may include, for example, but not limited to, user, character, topology, item, action, resource and/or any other virtual space databases employed by the virtual space servers. In some implementations, the test commands generated by the test-command module 108 may test data persistency throughout the instance of the virtual space as facilitated by these databases. For example, in a case where a test input simulating a user action of building a barrack at a user city is obtained by the test case module 106, the test-command module 108 may generate a test command for testing data storage in a user database (e.g., insert a barrack entry in the user inventory), a test command for testing data storage in the resource database (e.g., reducing an amount of resources consumed by the Barrett computing activity), and/or any other test command for testing databases employed by the virtual space servers.

In some implementations, for generating test commands that test sever components in response to an obtained test input, semantics such as, without limitation, application programming interface (API), server information (e.g. module locations on specific servers, IP address of the servers, availabilities of the servers, and so on), syntax for invoking services provided by the servers, information indicating data access points and/or any other semantics may be obtained by the test-command module 108. In some examples, API provided by server modules may be specified by the developer of the virtual space and such API information may be configured into the test-command module 108 such that the generated test commands may include the API information for testing server components.

In some implementations, the test-command module 108 may dynamically determine a set of server components that may be tested in response to a specific user action simulated by a given test input. Such determinations may be made by the test-command module 108 based on associations between test inputs and corresponding test commands predefined by the developer of the test system 100. For example, an association between a test input that simulates build action by users and a set of test commands that test server modules executing the barrack building in the virtual space, load balancing, and database consistency may be obtained; another association between test input that simulates user action directing a user character maneuver in the virtual space and a set of test commands that test server modules implementing virtual space physics in response to the directed maneuver may be obtained; and so on.

Test-execution module 110 may be configured to execute the test commands generated by the test-command module 108. To facilitate such executions, the developer of the test the system 100, tester of the virtual space, quality assurance personnel of the virtual space, and/or any other entities related to the test system 100 may specify a list of client computing platforms and/or virtual space servers available for executing the test commands generated by the test-command module 108. For instance, the IP address, computer name, operating system, and/or any other information regarding the client computing platforms and/or the virtual space servers may be specified and the stored on electronic storage 104. Based on such information, the test-execution module 110 may generate, for example, but not limited to, intra procedure calls (IPC), remote procedure calls (RPC), operating system commands, virtual space commands, and/or any other system calls for executing the test commands on the client computing platforms and/or virtual space servers. In some implementations, the test-execution module 110 may be configured to obtain information indicating locations of server modules, services, database access, and/or any other server information. Based on such server information, the test-execution module 110 may generate system calls to invoke server components that provide the services, functionalities, database storage, and/or any other server side features for facilitating the virtual space.

In some implementations, the test-execution module 110 may be configured to verify test commands generated by the test command module 108. The verifications may be made by the test-execution module 110 based on the availability, performance, load, and/or any other properties of the client computing platforms and/or the virtual space servers for testing. For instance, the test-execution module 110 may obtain availability information regarding specific virtual space servers and/or client computing platforms periodically at a frequency predetermined by the developer of the test system 100. In cases where a virtual space server or client computing platform is not available (for example, the server or the client may be shut down or not operating) for executing a test command generated by the test-command module 108, the test-execution module 110 may generate an error message to indicate so.

In some implementations, the test-execution module 110 may be configured to generate OS commands to launch virtual space GUI on a client computing platform for testing virtual space GUI behaviors in response to a test command. For example, in response to a test input simulating a user action of building a barrack at the user's city, the test-command module 108 may generate a test command for testing GUI behaviors implemented on a client computing platform. Responsive to such a test command, the test-execution module 110 may obtain operating system information regarding the client computing platform, such as, a type of the OS (windows, Mac OS, android, iOS, UNIX, Linux, and/or any other OS), the version of the OS, the flavor of the OS, and/or any other operating system information regarding the client computing platform. Based on such operating system information regarding the client computing platform, the test-execution module 110 may generate an OS command to launch the virtual space GUI on the operating system of the client computing platform. In some implementations, the test-execution module 110 may generate OS commands based on the test command to simulate user interactions with the GUI, such as, but not limited to, mouse movements, finger movements, keyboards selection, and/or any other user interactions enabled by the virtual space GUI.

The test-result module 112 may be configured to obtain test results of test commands executed by the test-execution module 110. In some examples, the client computing platforms and/or virtual space servers that execute the test commands generated by the test command-module 108 may transmit test results through one or more data buffers located on electronic storage 104. In those examples, the test-result module 112 may be configured to obtain the test results from those buffers via electronic storage 104.

In some examples, for obtaining the test results, the test-result module 112 may generate commands, or system calls to retrieve the test results from the client computing platforms and/or virtual space servers. For instance, to retrieve test results for testing virtual space GUI behaviors, the test result module 112 may be configured to generate system calls to invoke an image recognition module configured to capture screen images presented on a display coupled to or included in the client computing platform that executed the test command for testing virtual space GUI behavior. In that instance, the test result module 112 may be configured to employ the image recognition module (e.g., through the API provided by the image recognition module) to obtain the GUI behaviors resulted from the test command by analyzing the screen image(s) captured by the image recognition module.

In cases where test commands have been executed to test databases employed by the virtual space servers, the test-execution module 112 may generate one or more data quarries for retrieving test results from the databases. For example, the test-execution module 112 may generate SQL queries to query data entries in the databases employed by the virtual space servers in response to test commands that test one or more databases employed by the virtual space. In those cases, for such data queries, the test execution module 112 may obtain information regarding data access points for the database (for example, data access interface information such as ODBC, JDBC provided by the virtual space server, database server employed by the virtual space system, and so on).

Verification module 114 may be configured to obtain expected test results and to verify whether the test results obtained by the test-result module 112 comply with the expected test results. For a given test case, expected test result(s), or golden results, may be specified by the developer of the test system 100, tester of the virtual space, quality assurance personnel of the virtual space, provider of the virtual space, and/or any other entities related to the test system 100. The expected test results may specify, for the corresponding test case, correct functionalities as implemented on client computing platforms, correct executions of the simulated user actions by the test input on the virtual space servers, and/or correct database storage employed by the virtual space server. Such expected test results may be stored on electronic storage 104 and may be obtained by the verification module 114 at runtime of test system 100. Based on the obtained expected test results for the test case, the verification module 114 may verify the test results obtained by the test-result module 112 by comparing the test results with the obtained expected test results. In some examples, such comparison may be made by the verification module 114 by simply performing textual matching of the test results and the expected results. The verification module 114 may be configured to generate error messages in cases where the test results for the corresponding test case do not match the expected test results.

External resources 116 may include sources of information, hosts and/or providers of virtual environments outside of test system 100, external entities participating with system 100, and/or other resources. In some implementations, some or all of the functionality attributed herein to external resources 116 may be provided by resources included in test system 100.

Test system 100 may include electronic storage 104, one or more processors 102, and/or other components. Test system may include communication lines, or ports to enable the exchange of information with virtual space server, client computing platform, a network and/or other computing platforms. Illustration of test system 100 in FIG. 1 is not intended to be limiting. Test system 100 may include a plurality of hardware, software, and/or firmware components operating together to provide the functionality attributed herein to test system 100. For example, test system 100 may be implemented by a cloud of computing platforms operating together as test system 100.

Electronic storage 104 may comprise non-transitory storage media that electronically stores information. The electronic storage media of electronic storage 104 may include one or both of system storage that is provided integrally (i.e., substantially non-removable) with test system 100 and/or removable storage that is removably connectable to test system 100 via, for example, a port (e.g., a USB port, a firewire port, etc.) or a drive (e.g., a disk drive, etc.). Electronic storage 104 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 104 may include one or more virtual storage resources (e.g., cloud storage, a virtual private network, and/or other virtual storage resources). Electronic storage 104 may store software algorithms, information determined by processor 102, information received from test system 100, information received from client computing platforms, and/or other information that enables test system 100 to function as described herein.

Processor(s) 102 is configured to provide information processing capabilities in test system 100. As such, processor 102 may include one or more of a digital processor, an analog processor, a digital circuit designed to process information, an analog circuit designed to process information, a state machine, and/or other mechanisms for electronically processing information. Although processor 102 is shown in FIG. 1 as a single entity, this is for illustrative purposes only. In some implementations, processor 102 may include a plurality of processing units. These processing units may be physically located within the same device, or processor 102 may represent processing functionality of a plurality of devices operating in coordination. The processor 102 may be configured to execute modules 106, 108, 110, 112, 114 and/or other modules. Processor 102 may be configured to execute modules 106, 108, 110, 112, 114 and/or other modules by software; hardware; firmware; some combination of software, hardware, and/or firmware; and/or other mechanisms for configuring processing capabilities on processor 102. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112, 114, are illustrated in FIG. 1 as being implemented within a single processing unit, in implementations in which processor 102 includes multiple processing units, one or more of modules 106, 108, 110, 112, 114 may be implemented remotely from the other modules. The description of the functionality provided by the different modules 106, 108, 110, 112, 114 described below is for illustrative purposes, and is not intended to be limiting, as any of modules 106, 108, 110, 112, 114 may provide more or less functionality than is described. For example, one or more of modules 106, 108, 110, 112, 114 may be eliminated, and some or all of its functionality may be provided by other ones of modules 106, 108, 110, 112, 114. As another example, processor 102 may be configured to execute one or more additional modules that may perform some or all of the functionality attributed below to one of modules 106, 108, 110, 112, 114.

Figure 2:
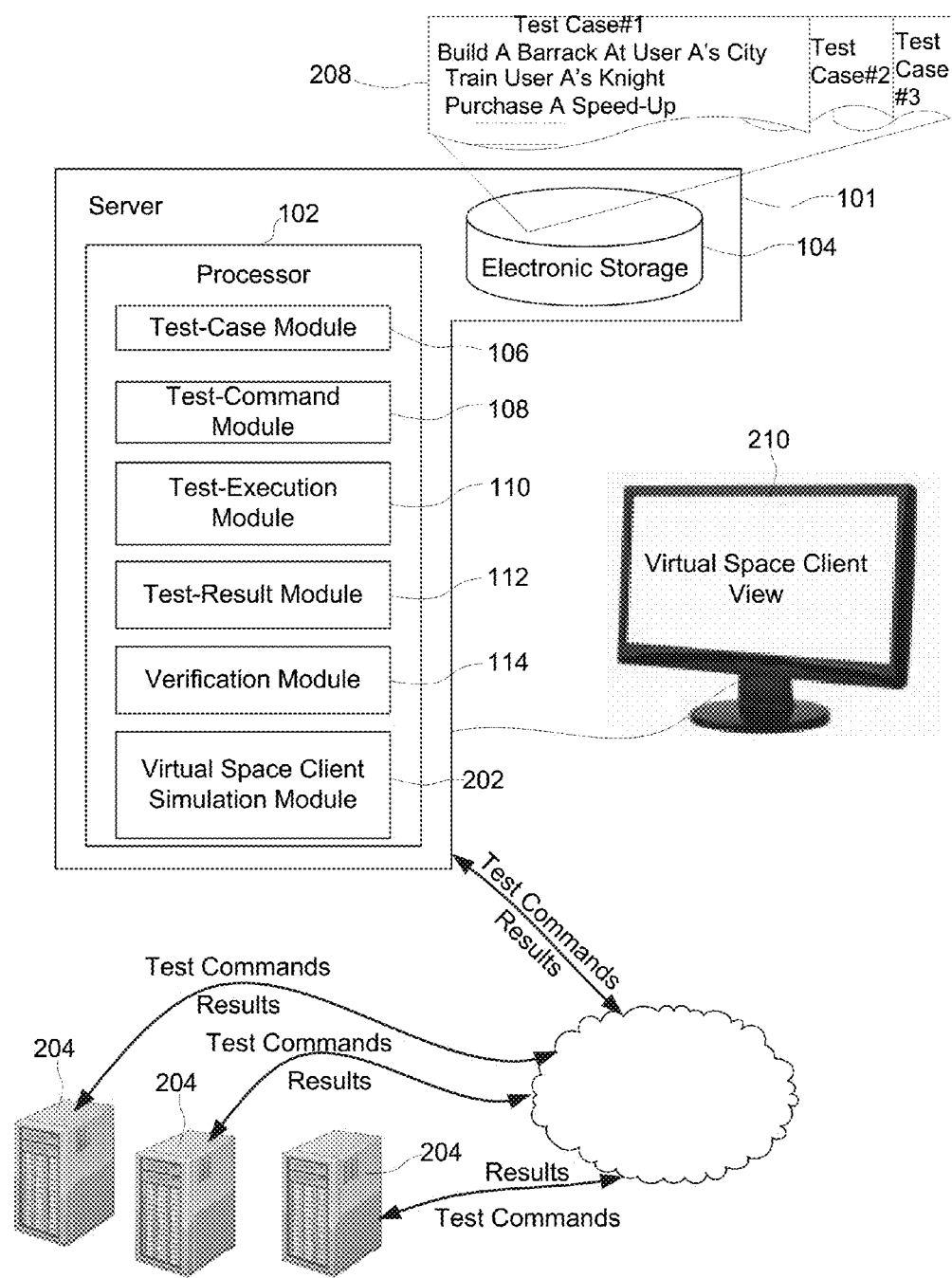
FIG. 2 illustrates an example for performing integrated testing using a test system as shown in FIG. 1.

FIG. 2 illustrates an example for performing integrated testing using a test system as shown in FIG. 1. It will be described with references to FIG. 1. As shown in this example, the server 101 may include a virtual space client simulation module 202 configured to simulate virtual space on a client side. As also shown, the electronic storage 104 may store test cases 208. In this example, the test case #1, as illustrated, may specify test inputs, among other testing puts, simulating user actions to build a barrack at a user city, train a user knight, and the purchase a speed up for the user. Such user actions may be simulated by the virtual space simulation module 202 on the server 101. In this example, the test command module 108 generates a test command based on the test case #1 obtained by the test-case module 106 for testing the virtual space view presented on the display 210. Such a test command may be executed by the test-execution module 110 on the server 101 through the virtual space client simulation module 202. Responsive to test command executed by the test-execution module 110, virtual space views may be presented on display 210. The virtual space GUI behaviors corresponding to execution of the test command may be obtained by the test-result module 112 by using image recognition methods that capture screen images on the display 210. The captured screen image may be analyzed by the image recognition methods for GUI behaviors responsive to the test commands by the test-result module 112. The obtained GUI behavior may be compared with expected test results by the verification module 114.

As also shown in this example, the test-command module 108 may generate one or more test commands for testing server components provided by virtual space servers 204 based on the test inputs included in the test case #1. As illustrated, the test-result module 112 may obtain the test results from the servers 204. The test-results may be compared with expected test results by the verification module 114 for verifying server execution of the test inputs specified in test case #1 as illustrated.

Figure 3:
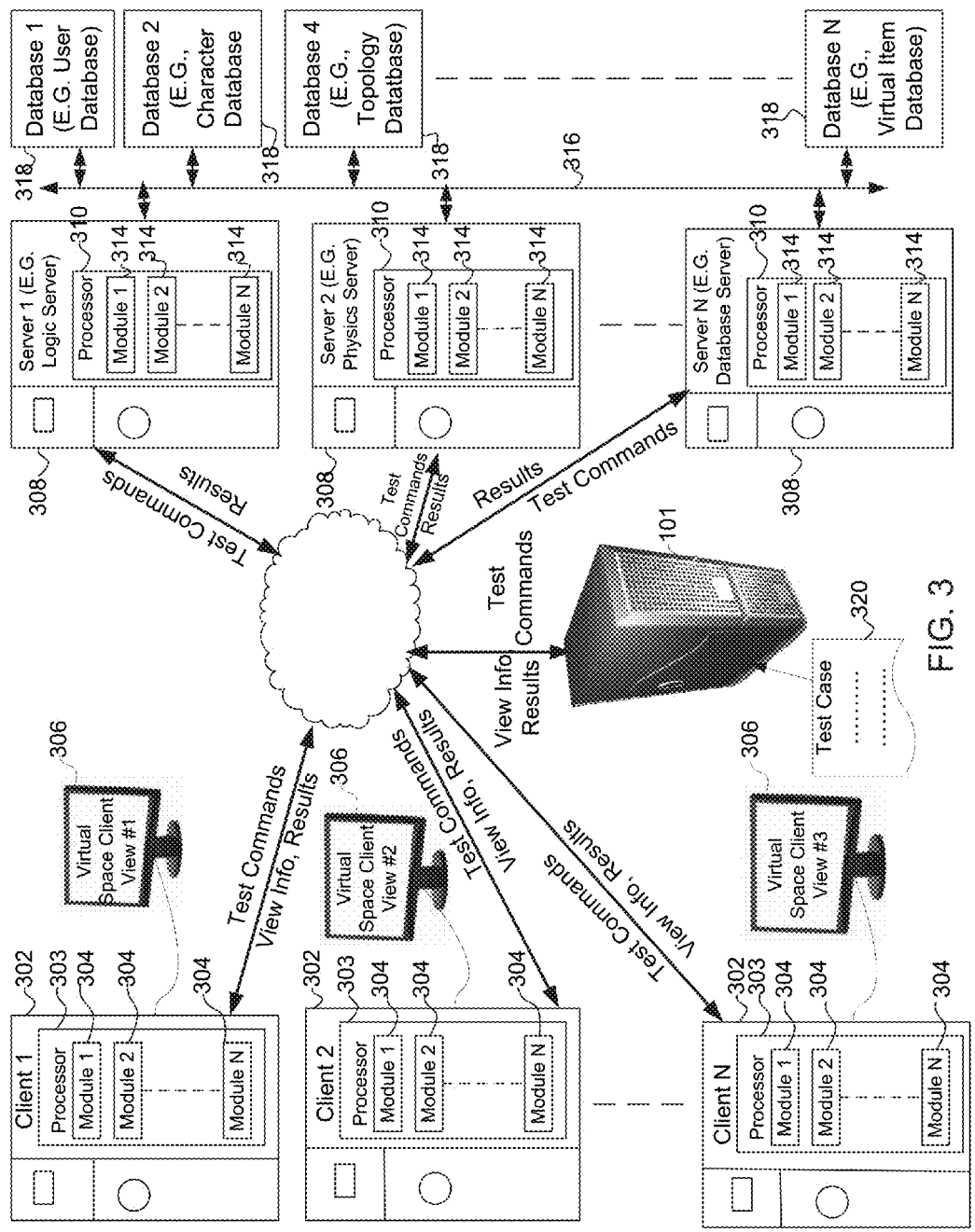
FIG. 3 illustrates another example of performing integrated testing of a virtual space using a test system as illustrated in FIG. 1.

FIG. 3 illustrates another example of providing integrated testing of a virtual space using a test system as illustrated in FIG. 1. It will be described with references to FIG. 1. As shown in this example, responsive to obtaining test inputs for a test case 320, the server 101 may generate test commands. In this example, the generated test commands include test commands for testing client computing platforms 302 and as well as test commands for testing server components provided by virtual space servers 308. That is, in this example, the server 101 generates test commands for testing client side functionalities and server components simultaneously in response to the test inputs obtained from the test case 320. As shown, the client computing platforms 302 may include processors 303 configured to execute virtual space modules 304 for implementing the virtual space on the client computing platforms 302. As also shown, the client computing platforms 302 in this example are connected with displays 306 configured to present virtual space views associated with corresponding client computing platforms 302.

As also shown, the test commands generated by server 101 may include test commands for testing server components, which in this example includes virtual space servers 308 and databases 318 employed by the virtual space servers 308. As shown, the virtual space severs 308 include processors 310 configured to execute server modules 314. The server modules 314 may facilitate virtual space functionalities, provide virtual space services, facilitate access to the virtual space information stored on databases 318, and/or any other virtual space features implemented on the virtual space servers 308 for facilitating user participation in the virtual space. As shown, the virtual space servers 308 may communicate with each other and with the databases through a system communication channel 316. The test commands may be executed to invoke one or more server modules 314 for testing server-side execution of the virtual space in response to the test inputs.

As also shown, the server 101 may obtain test results from the client computing platforms 302 and virtual space servers for verification. In this example, the server 101 may also obtain view information implemented on the client computing platforms 302 in response to the test inputs. The obtained view information may be analyzed by the server 101, e.g., via test-result module 112 for testing data persistency within the virtual space in response to the test inputs.

Figure 4:
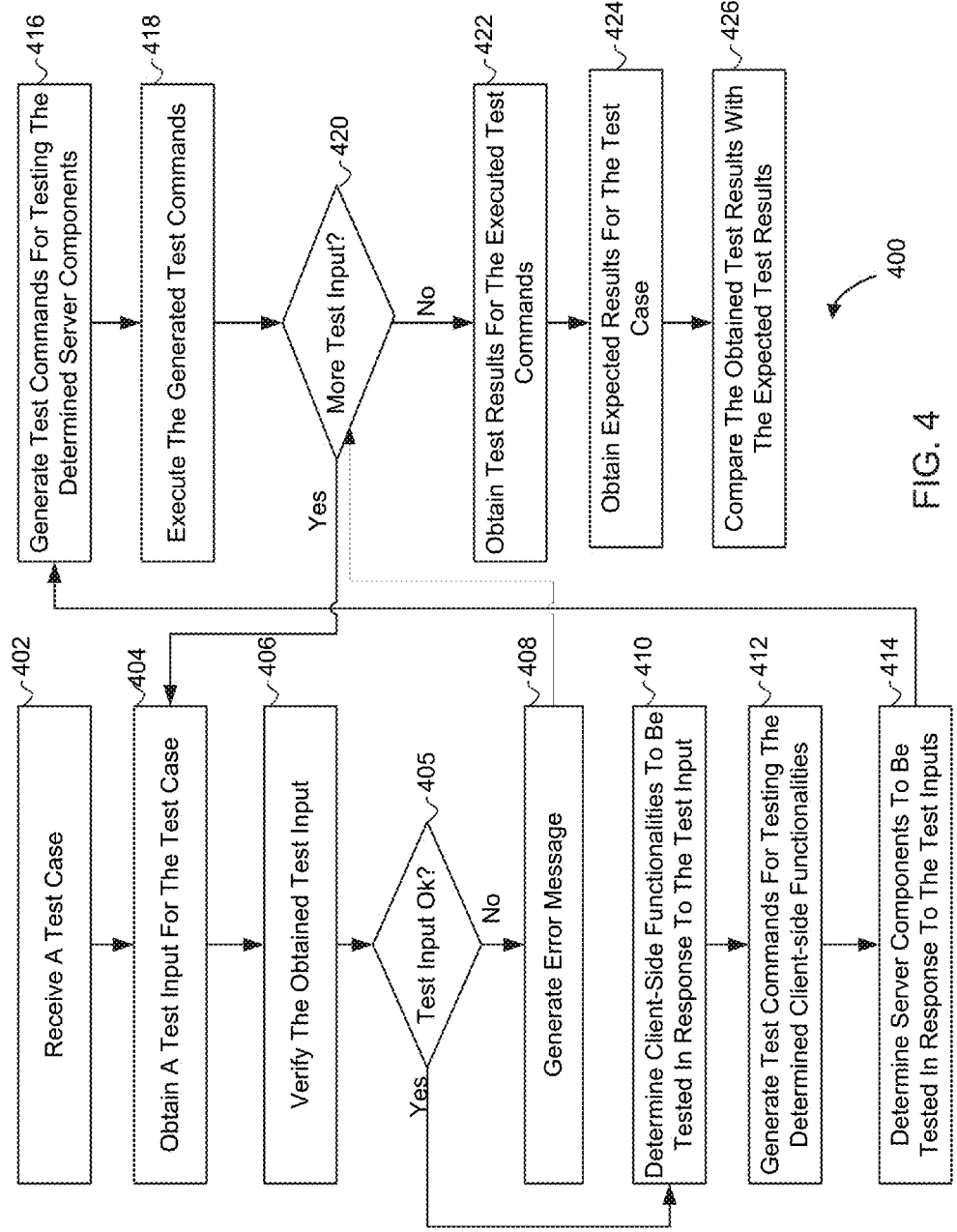
FIG. 4 illustrates an exemplary method for providing integrated testing of a virtual space.

FIG. 4 illustrates an exemplary method 400 for providing integrated testing of a virtual space. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 402, a test case may be received. In some implementations, operation 402 may be performed by a test-case module the same as or similar to test-case module 106 (shown in FIG. 1 and described herein).

At operation 404, a test input may be obtained for the test case received in operation 402. In some implementations, operation 404 may be performed by a test-case module the same as or similar to test-case module 106 (shown in FIG. 1 and described herein).

At operation 406, the test input obtained in operation 404 may be verified. In some implementations, operation 406 may be performed by a test-case module the same as or similar to test-case module 106 (shown in FIG. 1 and described herein).

At operation 405, a decision whether the test input is verified by the operation 406 is made. In cases where it is determined by the operation 405 that the test input is not verified, the method 400 proceeds operation 408. At operation 408, an error message indicating that the test input is invalid may be generated. In some implementations, operation 408 may be performed by a test-case module the same as or similar to test-case module 106 (shown in FIG. 1 and described herein). In cases where it is determined by the operation 405 that the test input is valid, the method 400 proceeds to operation 410.

At operation 410, client-side functionalities that may be tested in response to the test input obtained in the operation 404 may be determined. In some implementations, operation 410 may be performed by a test-command module the same as or similar to test-command module 108 (shown in FIG. 1 and described herein).

At operation 412, one or more test commands for testing the client-side functionalities determined in operation 410 may be generated. In some implementations, operation 412 may be performed by a test-command module the same as or similar to test-command module 108 (shown in FIG. 1 and described herein).

At operation 414, server components that may be tested in response to the test input obtained in the operation 404 may be determined. In some implementations, operation 414 may be performed by a test-command module the same as or similar to test-command module 108 (shown in FIG. 1 and described herein).

At operation 416, one or more test commands for testing the server components determined in operation 414 may be generated. In some implementations, operation 416 may be performed by a test-command module the same as or similar to test-command module 108 (shown in FIG. 1 and described herein).

At operation 418, the test commands generated in operations 412 and 416 may be executed. In some implementations, operation 418 may be performed by a test-execution module the same as or similar to test-execution module 110 (shown in FIG. 1 and described herein).

At operation 420, a decision whether there is more test input obtained from the test case received in the operation 402 is made. In the case where it is determine there is more test input, the method 400 proceeds back to operation 404, and repeat operations 404-418. In cases where it is determined that there is no more test input, the method 400 proceeds to operation 422.

At operation 422, test results for the test commands executed in operation 418 may be obtained. In some implementations, operation 422 may be performed by a test-result module the same as or similar to test-result module 112 (shown in FIG. 1 and described herein).

At operation 424, expected test results may be obtained for test case received in the operation 402. In some implementations, operation 424 may be performed by a verification module the same as or similar to verification module 114 (shown in FIG. 1 and described herein).

At operation 426, the test results obtained in operation 422 may be compared with the expected test results obtained in operation 424. In some implementations, operation 426 may be performed by a verification module the same as or similar to verification module 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for performing integrated testing of a virtual space, the method being implemented in one or more physical processors configured to execute computer program modules, the method comprising:

executing a virtual space on one or more virtual space servers in which users participate in a game over a network and implement the virtual space over the network to facilitate presentation of the online game to users on client computing platforms;

receiving test cases and obtaining test inputs for the test cases, the test inputs being simulated virtual space actions input by users on client computing platforms when participating in the game in the virtual space provided over a network;

generating test commands based on the obtained test inputs such that responsive to obtaining a first test input simulating a first user action in the virtual space, generating a first set of test commands for testing functionalities implemented on the client computing platform corresponding to the first test input simulating the first user action in the online game occurring in the virtual space, and a second set of test commands for testing one or more server components that facilitate the first user action in the online game occurring in the virtual space simulated by the first test input, the server components being executed by one or more virtual space servers;

executing the generated test commands such that responsive to generation of the first set of test commands and the second set of test commands by the test-command module, simultaneously executing the first set of test commands on the client computing device corresponding to the first test input and the second sets of test commands on the one or more virtual space servers;

obtaining results of test commands such that responsive to the execution of the first and second sets of test commands, obtaining a first set of results corresponding to the first set of test commands executed on the client computing device corresponding to the first test input and a second set of results corresponding to the second set of test commands executed on the one or more virtual space servers; and obtaining expected test results and verifying whether the obtained test results match the expected test results such that responsive to the first set and second set of test results being obtained, verifying whether the first set and second set of test results match corresponding expected test results.

2. The method of claim 1, wherein the generated first set of test commands for testing functionalities implemented on the client computing platform includes one or more test commands for testing a virtual space graphical user interface implemented on the client computing platform and/or one or more test commands for testing virtual space modules being executed on the client computing platform to facilitate the first user action simulated by the first test input.

3. The method of claim 2, wherein the generated first set of test commands for testing functionalities implemented on the client computing platform includes at least one test command for testing the virtual space graphical user interface implemented on the client platform.

4. The method of claim 3, further comprising obtaining screen images of virtual space graphical user interfaces implemented on client computing platforms and analyzing the obtained screen images for virtual space user graphical user interface behavior changes driven by test commands for testing virtual space graphical user interfaces implemented on the client computing platform such that responsive to the execution of the test command for testing virtual space graphical user interface implemented on the client platform, obtaining one more screen images of the virtual space graphical user interface implemented on the client computing platform and analyzes the obtained screen images for one or more user virtual space user graphical user interface behavior changes.

5. The method of claim 1, wherein the generated second set of test commands for testing the server components includes one or more test commands for testing server modules being executed on one or more virtual space servers to facilitate the first user action simulated by the first test input, one or more test commands for testing services provided by the virtual space servers to facilitate user participation of the virtual space, and/or one more test commands for testing databases employed by the virtual space servers.

6. The method of claim 1, further comprising dynamically determine the functionalities implemented on the client computing platform to be tested corresponding to the first input simulating the first user action in the virtual space, and/or dynamically determining the server components to be tested for facilitating first user action simulated by the first test input.

7. The method of claim 1, further comprising verifying whether the obtained test inputs are valid.

8. The method of claim 1, wherein obtaining results of test commands comprises generating commands to retrieve the results from the client computing platforms and/or virtual space servers.

9. The method of claim 8, further comprising responsive to a test command for testing a database employed by the virtual space servers, generating one or more data inquiry commands to retrieve virtual space information from the database corresponding to the test command for testing the database.

10. A test system configured to perform integrated testing of a virtual space, the test system comprising:
    one or more processors configured to execute computer program modules, the computer program modules comprising:
        a virtual space module configured to execute a virtual space on one or more virtual space servers in which users participate in a game over a network and implement the virtual space over the network to facilitate presentation of the online game to users on client computing platforms;
        a test-case module configured to receive test cases and to obtain test inputs for the test cases, the test inputs being simulated virtual space actions input by users on client computing platforms when participating in the game in the virtual space provided over a network;
        a test-command module configured to generate test commands based on the test inputs obtained by the test-case module such that responsive to obtaining a first test input simulating a first user action in the virtual space by the test-case module, the test-command module generates a first set of test commands for testing functionalities implemented on the client computing platform corresponding to the first test input simulating the first user action in the online game occurring in the virtual space, and a second set of test commands for testing one or more server components that facilitate the first user action in the online game occurring in the virtual space simulated by the first test input, the server components being executed by one or more virtual space servers;
        a test-execution module configured to execute the generated test commands such that responsive to generation of the first set of test commands and the second set of test commands by the test-command module, the test-execution module simultaneously executes the first set of test commands on the client computing device corresponding to the first test input and the second sets of test commands on the one or more virtual space servers;
        a test-result module configured to obtain results of test commands such that responsive to the execution of the first and second sets of test commands, the test-result module obtains a first set of results corresponding to the first set of test commands executed on the client computing device corresponding to the first test input and a second set of results corresponding to the second set of test commands executed on the one or more virtual space servers; and
        a verification module configured to obtain expected test results and to verify whether the test results obtained by the test-result module match the expected test results such that responsive to the first set and second set of test results being obtained by the test-result module, the verification module verifies whether the first set and second set of test results match corresponding expected test results.

11. The test system of claim 10, wherein the test-command module is configured such that the generated first set of test commands for testing functionalities implemented on the client computing platform includes one or more test commands for testing a virtual space graphical user interface implemented on the client computing platform and/or one or more test commands for testing virtual space modules being executed on the client computing platform to facilitate the first user action simulated by the first test input.

12. The system of claim 11, wherein the test-command module is configured such that the generated first set of test commands for testing functionalities implemented on the client computing platform includes at least one test command for testing the virtual space graphical user interface implemented on the client platform.

13. The system of claim 12, wherein the test-result module is further configured to obtain screen images of virtual space user graphical interfaces implemented on client computing platforms and to analyze the obtained screen images for virtual space graphical user interface behavior changes driven by test commands for testing virtual space graphical user interfaces implemented on the client computing platform such that responsive to the execution of the test command for testing the virtual space graphical user interface implemented on the client platform, the test-result module obtains one more screen images of the virtual space user graphical user interface implemented on the client computing platform and analyzes the obtained screen images for one or more user virtual space graphical user interface behavior changes.

14. The test system of claim 10, wherein the test-command module is configured such that the generated second set of test commands for testing the server components includes one or more test commands for testing server modules being executed on one or more virtual space servers to facilitate the first user action simulated by the first test input, one or more test commands for testing services provided by the virtual space servers to facilitate user participation of the virtual space, and/or one or more test commands for testing databases employed by the virtual space servers.

15. The system of claim 10, wherein the test-command module is further configured to dynamically determine the functionalities implemented on the client computing platform to be tested corresponding to the first input simulating the first user action in the virtual space, and/or to dynamically determine the server components to be tested for facilitating first user action simulated by the first test input.

16. The system of claim 10, wherein the test-case module is further configured to verify whether the obtained test inputs are valid.

17. The system of claim 10, wherein the test-result module is configured such that the test-result module obtains results of test commands by generating commands to retrieve the results from the client computing platforms and/or virtual space servers.

18. The system of claim 17, wherein the test-result module is further configured such that responsive to a test command for testing a database employed by the virtual space servers, the test-result module generates one or more data inquiry commands to retrieve virtual space information from the database corresponding to the test command for testing the database.

\* \* \* \* \*